United States Patent
Mousa et al.

(10) Patent No.: US 10,094,941 B2
(45) Date of Patent: Oct. 9, 2018

(54) SYSTEM AND METHOD FOR ACQUISITION AND PROCESSING OF SEISMIC DATA USING COMPRESSIVE SENSING

(71) Applicant: KING FAHD UNIVERSITY OF PETROLEUM AND MINERALS, Dhahran (SA)

(72) Inventors: Wail A. Mousa, Dhahran (SA); Arbab Latif, Dhahran (SA); Abdullatif Al-Shuhail, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 191 days.

(21) Appl. No.: 15/144,212

(22) Filed: May 2, 2016

(65) Prior Publication Data
US 2016/0327661 A1    Nov. 10, 2016

Related U.S. Application Data

(60) Provisional application No. 62/159,112, filed on May 8, 2015.

(51) Int. Cl.
*G01V 1/24*    (2006.01)
*G01V 1/28*    (2006.01)
(Continued)

(52) U.S. Cl.
CPC ............... *G01V 1/003* (2013.01); *G01V 1/164* (2013.01); *G01V 1/24* (2013.01); *G01V 1/28* (2013.01);
(Continued)

(58) Field of Classification Search
CPC . G01V 1/003; G01V 1/24; G01V 1/28; G01V 1/64; G01V 2210/169; G01V 2210/45; G01V 2210/46
(Continued)

(56) References Cited

U.S. PATENT DOCUMENTS 7,813,222 B2 * 10/2010 Elder ...................... G01V 1/247
367/76
8,687,689 B2 * 4/2014 Baraniuk ............... H03M 13/11
375/240.01
(Continued)

FOREIGN PATENT DOCUMENTS

CN    104345340 A    2/2015

OTHER PUBLICATIONS

Gilles Hennenfent, et al., "Random sampling: new insights into the reconstruction of coarsely-sampled wavefields", SEG Technical Program Expanded Abstracts, vol. 26, No. 1, Jan. 2007, 5 pages.
(Continued)

*Primary Examiner* — Daniel L Murphy
(74) *Attorney, Agent, or Firm* — Oblon, McClelland, Maier & Neustadt, L.L.P.

(57) ABSTRACT

Aspects of the disclosure provide a system for seismic sample data acquisition and processing. The system includes an acquisition system configured to acquire seismic sample data using compressive sensing. The acquisition system includes a plurality of receivers each configured to randomly sample a seismic signal to generate seismic sample data, and a data collection system configured to control sampling operations of the plurality of receivers, and receive and store the generated seismic sample data.

9 Claims, 2 Drawing Sheets

(51) Int. Cl.
*G01V 1/00* (2006.01)
*G01V 1/16* (2006.01)
(52) U.S. Cl.
CPC .... *G01V 2210/169* (2013.01); *G01V 2210/45* (2013.01); *G01V 2210/46* (2013.01)
(58) Field of Classification Search
USPC .......................................................... 367/38
See application file for complete search history.

(56) References Cited

U.S. PATENT DOCUMENTS

2010/0302086 A1  12/2010  Dudgeon et al.
2015/0124560 A1  5/2015   Li et al.

OTHER PUBLICATIONS

Emmanuel J. Candès, et al., "An Introduction to Compressive Sampling", IEEE Signal Processing Magazine, vol. 25, No. 2, Mar. 2008, pp. 21-30.
Richard G. Baraniuk, "Compressive Sensing", IEEE Signal Processing Magazine, Jul. 2007, pp. 118-121.
Felix J. Herrmann, et al., "Fighting the curse of dimensionality: compressive sensing in exploration seismology", IEEE Signal Processing Magazine, vol. 29, No. 3, May 2012, pp. 88-100.
Charles C. Mosher, et al., "Non-uniform optimal sampling for simultaneous source survey design", SEG Denver 2014 Annual Meeting, 2014, pp. 105-109.

* cited by examiner

SYSTEM AND METHOD FOR ACQUISITION AND PROCESSING OF SEISMIC DATA USING COMPRESSIVE SENSING

INCORPORATION BY REFERENCE

This present disclosure claims the benefit of U.S. Provisional Application No. 62/159,112, "A Method and System for Acquisition of Land and Marine Reflection and Refraction Seismic Data Using Compressive Sensing" filed on May 8, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The goal of seismic exploration is to obtain information (images) of the earth subsurface so one can identify hydrocarbon structures present below the earth surface without any expensive or time consuming drilling. The Earth is composed of different layers with different physical properties. The acquired seismic sample data contains reflections from these different layers. By analyzing these layers after obtaining an image of the subsurface, geologists can predict the likelihood of hydrocarbon existence.

Generally, the process of acquiring seismic data is governed by the Nyquist-Shannon theorem, and seismic data is captured by sampling a seismic signal at least two times faster than the signal bandwidth. If one is interested to increase the resolution, he/she has to increase the sampling rate (number of samples). Large amount of data is thus acquired based on the sampling, leading to significant cost of acquiring and processing of such large amount of data.

In order to bypass the Nyquist-Shannon theorem and reduce the amount of seismic data, there exists a new nonlinear sampling theory known as Compressive Sensing (CS). The seismic signals can be sparse in some particular domains, such as curvelet, Radon, wave atom, Fourier, and the like. Compressive sensing exploits the sparse structure of the seismic signals and enables recovery of a high resolution signal using a small number of measurements far less compared to samplings based on the Nyquist-Shannon theorem. The compressive sampling rate is bounded by the sparsity of the seismic data instead of the Nyquist rate.

SUMMARY

Aspects of the disclosure provide a system for seismic sample data acquisition and processing. The system includes an acquisition system configured to acquire seismic sample data using compressive sensing. The acquisition system includes a plurality of receivers each configured to randomly sample a seismic signal to generate seismic sample data, and a data collection system configured to control sampling operations of the plurality of receivers, and receive and store the generated seismic sample data.

In an example, the data collection system includes a receiver controller configured to generate sampling configuration parameters to control the sampling operations of the plurality of receivers, and to generate a receiver activation signal to selectively activate a portion of the plurality of receivers according to a sensing matrix. In addition, the data collection system includes a data storage system configured to store the generated seismic sample data.

In an example, each of the plurality of receivers includes a sensor configured to sense a seismic wave to generate the seismic signal, a sampling controller configured to generate a random time-varying pulse sequence based on the sampling configuration parameters, and an analog to digital converter configured to sample the seismic signal based on the random time-varying pulse sequence. In an example, the configuration parameters include an operation rate, and a sampling probability.

In one example, the sampling controller includes a random number generator configured to generate a random number at the operation rate, a comparator configured to compare the random number with the sampling probability and generate a trigger signal when the random number is greater than the sampling probability, and a pulse generator configured to generate a pulse of the random time-varying pulse sequence when triggered by the trigger signal. In an example, the sampling controller starts a pulse generation operation after receiving the receiver activation signal.

In an example, a portion of the plurality of receivers are randomly distributed along a receiver line according to a sensing matrix corresponding to the receiver line.

In an example, the system for seismic sample data acquisition and processing further includes a processing system configured to recover seismic data from the seismic sample data. The processing system includes a processor configured to execute code instructions, and a memory configured to store recovery algorithms including code instructions which, when executed by the processor, causes the processor to recover the seismic data from the seismic sample data.

Aspects of the disclosure provide a method for seismic sample data acquisition and processing in a seismic survey employing a plurality of receivers. The method includes randomly distributing receivers along a receiver line according to a sensing matrix corresponding to the receiver line, selectively activating a portion of the plurality of receivers, randomly sampling a seismic signal to generate seismic sample data, and recover seismic data from the seismic sample data.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
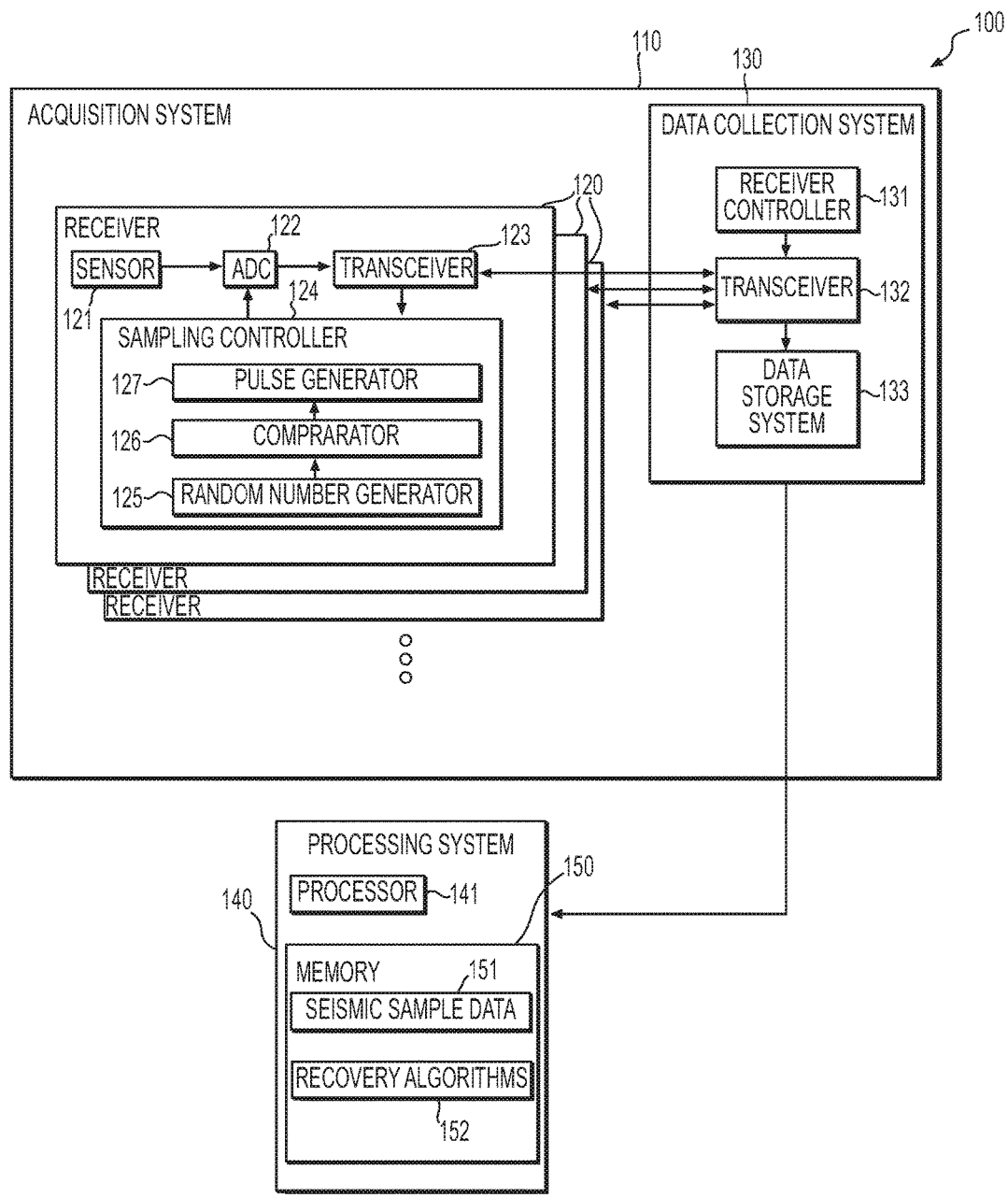
FIG. 1 shows a system for seismic sample data acquisition and processing according to an embodiment of the disclosure.

FIG. 1 shows a system 100 for seismic sample data acquisition and processing according to an embodiment of the disclosure. The system 100 includes an acquisition system 110, and a processing system 140, which are coupled together as shown in FIG. 1. The acquisition system 110 is configured to acquire seismic sample data using compressive sensing.

Generally, seismic sample data is acquired during a seismic survey. A seismic survey can employ a plurality of seismic sources, such as a sledgehammer, a dynamite explosive, an air gun, a vibrator, and the like, and a plurality of receivers each including a sensor, such as a geophone, a hydrophone, and the like. The positions of the seismic sources and receivers can be arranged in a certain geometry, such as a sampling grid which include a set of vertical receiver lines and a set of horizontal source lines. When a seismic source at a location is triggered, which is referred to as a shot, seismic waves are generated and travel through the earth subsurface. Each layer within the subsurface reflects a portion of the wave's energy back and allows the rest to refract through. The sensors in the receivers sense these reflected seismic waves to generate an analog electrical signal, referred to as a seismic signal. The receivers can include circuitry that samples the seismic signal to generate seismic sample data over a predetermined time period (called a record length). Thereafter, the shot location is moved to a next position in the sampling grid, and the process is repeated.

A signal recovered from the seismic sample data acquired at a receiver corresponding to a single shot forms a curve along a time axis, and the curve is known as a trace. A set of traces corresponding to a shot are organized to form a seismic image, such as a two-dimensional (2D) image or three-dimensional (3D) image. In a 2D image, traces corresponding to receivers arranged in a same receiver line are stacked along a time axis in order of transceiver locations to form the 2D image, while in a 3D image, traces corresponding to receivers arranged in multiple receiver lines are stacked along a time axis to form the 3D image. Information in a trace can reflect arrival times of seismic waves reflected from different layers of the subsurface. By interpreting the seismic image, hydrocarbon structures can be revealed.

As shown, seismic sample data acquired during a survey employing multiple shots, receivers and sources can have five dimensions: one time dimension corresponding to the record length, two dimensions for the sources corresponding to locations of the sources, and two dimensions for the receivers corresponding to locations of the receivers. Compressive sensing exploits structure in seismic data (sparsity in some transform domains), and allows subsampling schemes whose sampling is proportional to the sparsity rather than to the dimensionality of seismic data, and recovery of the seismic signal from the subsampled measurements. For example, numbers of sources, receivers or sampling rate of a seismic survey can be reduced, such that volume of acquired seismic sample data can be reduced, but seismic signals recovered from the reduced seismic sample data can maintain a similar accuracy.

Compressive sensing relies on two principles: sparsity, which pertains to the signals of interest, and incoherence, which pertains to the sensing modality. Sparsity refers that many natural signals are sparse or compressible in the sense that they have concise representations when expressed in a proper basis. For example, samples of an audio signal can be transformed using Fourier transform to the frequency domain where the audio signal is expressed as a superposition of infinite frequency elements each having a coefficient. However, in frequency domain, energy of the signal is concentrated in limited number of frequencies, and frequency elements with little energy can be removed without significant reduction of quality. As a result, the audio signal can be compressed or approximated to have a reduced number of frequency elements. In compressive sensing, a signal is said to be K sparse in a transform domain if it has maximum K non-zero elements in the transform domain. Accordingly, the transform is referred to as a sparsifying transform.

Incoherence covers the duality between transformed domain and the captured domain (e.g., frequency domain and time domain). If a signal is sparse in time, then it will be spread out in frequency domain or vice versa. In other words, incoherence is needed to measure the signal in such a way that the maximum amount of information can be extracted from the signal by using small amounts of measurement. Mathematical techniques necessary to implement compressive sensing include the selection of appropriate transforms. $L_1$ optimization is used for the representation of the signal in the sparse domain. The $L_1$ minimization concentrates the energy of the signal onto a few non-zero coefficients.

Consider a seismic signal represented by the seismic sample data g(n) acquired using traditional sampling techniques. The signal can be based on any dimensions, such as the time dimension or spatial dimension. The data g(n) contains N uniformly spaced samples and each sample can be represented as follows:

$$g(n) = \sum_{i=1}^{N} x_i \psi_i \quad (1)$$

where $x_i$ are the coefficient sequence of g(n) with $\psi_i$ as orthonormal basis. In terms of matrix, the expression (1) can be as follows:

$$g = \psi x. \quad (2)$$

For the multiplication to hold, the dimension of the representation matrix 4 should be N×N. If $\psi$ is a sparsifying transform, then g(n) is a sparse vector with size N. Let the number of non-zero entries in g(n) be K. In other words, g(n) is a K sparse vector with length N, when represented in basis $\psi$.

As g(n) is K sparse vector, so instead of sampling all the elements of g, the signal can be recovered by less number of samples y, as suggested by compressive sensing. Let $\varphi$ be another basis matrix, known as sensing matrix, with size M×N, where M<<N. The sampled signal y can be represented in terms of new basis $\varphi$ as follows:

$$Y = \varphi g. \quad (3)$$

Thus, $$y = \varphi g = \varphi \psi x = Ax. \quad (4)$$

The matrix $A = \varphi \psi$ is referred to as a measurement matrix with dimension M×N.

To recover the original signal g based on sampled signal y, one have to first find a coefficient vector x* by solving the following problem, $$Ax^* = y, \quad (5)$$

where the matrix A has less rows than the columns. So A is an under-determined system of linear equations where the number of unknowns is greater than the number of equations. Restricted isometric property (RIP) can be utilized for the perfect reconstruction of the under-sampled data. Many sensing matrices $\varphi$ satisfy the RIP. Besides RIP, the sensing matrix $\varphi$ and the representation matrix $\psi$ should have incoherence. If the RIP and incoherence are satisfied, the $L_1$-norm can be used to solve the ill-conditioned problem (5). Once the coefficient vector x* is estimated by the $L_1$-norm, the original signal g can be recovered by using the following relation, $$g = \psi x^*. \tag{6}$$

According to an aspect of the disclosure, various random matrix ensembles have been shown to be effective compressive measurement matrices, for example, Gaussian and Bernoulli matrices, and Fourier matrices with randomly selected rows. The number of measurements M required for exact recovery can be determined using the following expression, $$M \geq K \log(N/M), \tag{7}$$

where K is the sparsity level of the sparse signal, N is the ambient dimension of the sparse signal, such as the sampling grid size or a sampling rate of recovered seismic data. In other words, if the measurement matrix is chosen appropriately, the number of measurements scales logarithmically with the ambient dimension N, which is a tremendous improvement over the Nyquist sampling theory.

In an example, in order to determine a sensing matrix φ, an appropriate measurement basis B that is incoherent with the representation basis ψ is first selected. Then, all but M rows from B are discarded. The resulting M×N matrix is used as the sensing matrix φ. For example, if the signal u is sparse in Fourier domain, i.e., ψ is the DFT matrix, then an optimally incoherent measurement basis B can be given by $B = I_N$, where $I_N$ a N×N identity basis. By discarding N-M rows, the resultant M×N matrix including M rows of the identity matrix $I_N$ can be used as the sensing matrix φ. Accordingly, the obtained compressive samples y can be expressed as, $$y = \varphi u + e \tag{7}$$

where e is additive noise,

It is noted that there is a universal strategy for choosing φ that does not require prior knowledge of the sparsity basis ψ if the selected φ is an appropriate random measurement matrix, e.g., Gaussian and Bernoulli, that satisfies a certain concentration of measure property.

In FIG. 1, in one example, the acquisition system 110 includes a plurality of receivers 120, and a data collection system 130. Each of the plurality of receiver 120 is configured to randomly sample a seismic signal to generate seismic sample data. In an example, a receiver 120 includes a sensor 121, an analog to digital converter (ADC) 122, a transceiver 123, and a sampling controller 124.

The sensor 121 is configured to sense a seismic wave induced by a shot of a seismic source to generate an analogue electrical seismic signal. The sensor 121 can be various types, such as a geophone suitable for land seismic survey, a hydrophone suitable for marine seismic survey, and the like. In one example, the receiver 120 includes multiple sensors each configured for sensing different types of seismic waves, such as a reflection wave, a refraction wave, a shear wave. In this way, 3-component seismic data can be acquired. In one example, the sensor 121 includes a sensor array including a group of sensors arranged according to certain geometry.

The ADC 122 is configured to sample the analogue seismic signal to generate seismic sample data under the control of the sampling controller 124. The ADC 122 can include any suitable circuits to perform its function. The seismic sample data is transmitted to the transceiver 123. In an example, each sampling operation of the ADC 122 is triggered by a trigger signal generated from the sampling controller 124. When there is no trigger signal received, the ADC 122 does not perform the sampling operation.

The sampling controller 124 is configured to generate the trigger signal according to sampling configuration parameters received from the data collection system 130. In an example, the trigger signal includes a pulse sequence. Rising edge or falling edge of each pulse is used to trigger the sampling operation of the ADC 122. In addition, the pulse sequence is a random time-varying pulse sequence. For example, the sampling controller 124 performs a pulse generation operation periodically according to an operation rate. In each pulse generation operation, the sampling controller 124 makes a decision of whether to generate a pulse or not according to a sampling probability. For example, if the sampling probability is 30%, there is possibility of 30% to generate a pulse for each pulse generation operation. In this way, the pulses are generated randomly during a record length for a receiver to record seismic sample data. The above described operation rate and sampling probability are specified by the sampling configuration parameters received from the data collection system 130.

In an example, the sampling controller 124 includes a random number generator 125, a comparator 126, and a pulse generator 127. The random number generator 125 is configured to generate a random number at the operation rate. The comparator 126 is configured to compare the random number with a preconfigured threshold, such as the sampling probability. When the random number is smaller than the threshold, the comparator 126 generates a trigger signal triggering the pulse generator 127 to generate a pulse. In one example, the random number is uniformly distributed in the range between 0 and 1, and is generated at the operation rate, for example, 100 Hz. The comparator 126 receives the random number, and compares the random number with a threshold, for example, 0.3 which represents a sampling probability of 30%. If the random number is smaller than the threshold 0.3, the comparator 126 will generate a trigger signal. Accordingly, when triggered by the trigger signal, the pulse generator 127 generates a pulse for triggering a sampling operation of the ADC 122.

In an example, the sampling controller 124 is configured to start to generate the random time-varying sequence after receiving an activation signal from the data collection system 130. In the example, the data collection system 130 can selectively activate a portion of the plurality of receivers 120 to generate seismic sample data by transmitting an activation signal to the selected receivers 120. When a receiver 120 is not activated, the receiver 120 does not operate to generate seismic sample data. As the result, amount of seismic sample data can be reduced.

The transceiver 123 is configured to provide a communication channel between the receiver 120 and the data collection system 130. The transceiver 123 receives seismic sample data generated at the ADC 122, and transmits the seismic data to the data collection system 130. In addition, the transceiver 123 receives sampling configuration parameters, and transmits the sampling configuration parameters to the sampling controller 124. In an example, the transceiver 123 communicates with the data collection system 130 wirelessly, and receives wireless signal from and transmits wireless signal to the data collection system 130. In another example, the transceiver 123 communicates with the data collection system 130 via a cable. The transceiver 123 can include any suitable circuitry to perform its function, such as circuits for processing various communication protocols, encoder and decoder circuits, modulator and demodulator circuits, amplifier circuits, and the like.

Figure 2:
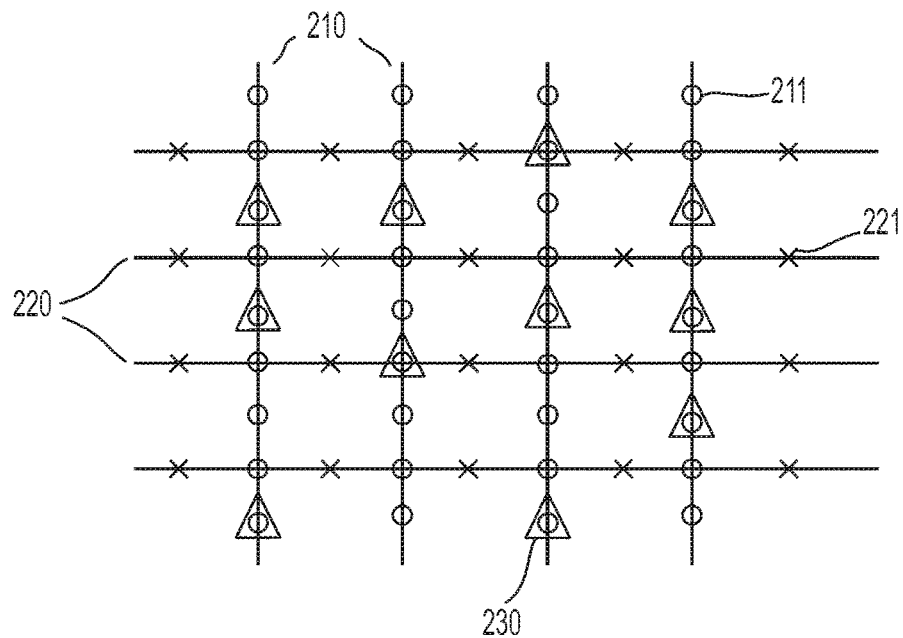
FIG. 2 shows a sampling grid for a seismic survey using compressive sensing according to an embodiment of the disclosure.

In an example, the plurality of transceiver 120 is distributed randomly in a sampling grid during a seismic survey employing compressive sensing. FIG. 2 illustrates such an example. FIG. 2 shows a sampling grid 200 for the seismic survey using compressive sensing. The sampling grid includes a plurality of receiver lines 210, and a plurality of source lines 220. Each receiver line 210 includes evenly spaced receiver positions 211, while each source line 220 includes evenly spaced source positions 221. In the example, receiver positions 211 are randomly selected, and receivers are randomly distributed at the selected receiver positions 230.

Specifically, receiver positions 211 in a receiver line 210 are selected according to a sensing matrix determined using compressive sensing method as described above. For example, a matrix including a portion of the rows of an identity matrix is selected to be the sensing matrix for a receiver line 210 during a planning stage of the seismic survey. Each row of the identity matrix corresponds to a receiver position in the sampling grid 200. If a row is missing in the sensing matrix, the receiver position in the receiver line 210 corresponding to the missing row will not be deployed with a receiver.

In various embodiments, the sensor 121 and other components in a receiver 120 can be implemented in a same device or in separate devices. In one example, the sensor 121 and other components in a receiver 120 are implemented in separate devices. Each sensor 121 can be connected with the other components via a cable or wirelessly. Analogue seismic signals generated at each seismic sensor 121 can be transmitted to the other components, and subsequently digitalized by the ADC 122.

The data collection system 130 is configured to generate sampling configuration parameters and activation signals to control the sampling operations of the plurality of receivers 120. In addition, the data collection system 130 is configured to receive and store the seismic sample data generated at the plurality of transceivers 120. In an example, the data collection system 130 includes a receiver controller 131, a data storage system 133, and a transceiver 132.

In one example, the receiver controller 131 is configured to generate sampling configuration parameters, such as the operation rate and the sampling probability, in order to implement a compressive sensing process. For example, it is determined in a planning stage of a seismic survey that a recovered seismic data corresponding to a trace at a receiver position is represented using N samples in a record length T. Accordingly, the operation rate of each receiver 120 can be determined to be N/T hz. In addition, a matrix including M rows of an N×N identity matrix is determined to be the sensing matrix where NM rows are randomly selected and discarded from the identity matrix. Accordingly, the sampling probability can be determined to be M/N, meaning that M pulses will be generated in N pulse generation operations at the respective sampling controller 124.

In another example, the receiver controller 131 is configured to generate the receiver activation signals in order to implement a compressive sensing process. For example, a sensing matrix corresponding to a receiver line 210 including N receiver positions is determined at a planning stage of a seismic survey. By employing the sensing matrix, only a portion of the receivers 120 deployed at all positions of the receiver line 210 is activated to perform the sampling operation. Specifically, the sending matrix can include M randomly selected rows of an N×N identity matrix. Accordingly, M receivers of the receiver line 120 are activated each corresponding to a row of the sensing matrix.

The receiver controller 131 can be implemented using any suitable software or hardware, or combination thereof. In an example, the receiver controller 131 is implemented using integrated circuits, such as application specific integrated circuits (ASIC), field programmable gate arrays (FPGA), and the like. In another example, the receiver controller 131 is implemented using computer program instructions which, when executed by a processor, causes the possessor to perform the above described functions.

The data storage system 133 is configured to receive seismic sample data generated at the plurality of receivers 120 via the transceiver 123/132, and store the seismic sample data in a computer readable medium, such as a random access memory (RAM), a read-only memory (ROM), a hard disk drive, an optical disk drive, and the like. In an example, a database management system is used to manage and store the seismic sample data.

After the seismic sample data is acquired using the acquisition system 110, the seismic sample data is transferred to the processing system 140. The data transfer can employ various methods in various examples. In one example, the seismic sample data is stored in a portable storage device, such as a DVD, a flash memory card, and the like. The processing system 140 subsequently reads the data from the portable storage device. In another example, the seismic sample data is transmitted to the processing system 140 through a communication network, such as a satellite communication network, a cellular wireless communication network, and the like.

The transceiver 132 is similar to the transceiver 123 in terms of function and structure, and description of the transceiver 132 is thus omitted for brevity.

The processing system 140 is configured to recover seismic data from the seismic sample data acquired by the acquisition system 110 using suitable recovery algorithms. The seismic data here refers to seismic data representing traces required for creating a 2D or 3D image suitable for analyzing the geologic structure of a region under investigation. For example, during a seismic survey using compressive sensing, samples (referred to as compressive samples) for a record length at a receiver are acquired with sub-Nyquist sampling, thus numbers of the compressive samples for a record length at the receiver are smaller than that corresponding to traditional Nyquist sampling. In order to obtain a trace of the receiver suitable for creating a 2D or 3D image, more samples need to be constructed (recovered) based on the compressive samples.

The recovery can be realized by processing the seismic sample data using recovery algorithms. The algorithms receive seismic sample data as input, and generate recovered seismic data as input.

In an example, the processing system 140 includes hardware components, such as a processor 141, and a memory 150, and the like, and software components, such as various code instructions of recovery algorithms 152 stored in the memory 150. In addition, the processing system 140 can store seismic sample data 351 in the memory 150.

The processing system 140 can be any suitable system, such as a desktop computer, a laptop computer, a tablet computer, a smart phone, and the like. The processing system 140 can include other suitable components (not shown), such as a display, a touchscreen, a microphone, a communication component, and the like. In an embodiment, the processing system 140 includes a single integrated circuit (IC) chip that integrates various circuits, such as the processor 141, the memory 150, and the like on the single IC chip. In another embodiment, the processing system 140 includes multiple IC chips, such as a processor chip, a memory chip and the like that are suitably coupled together.

The processor 141 can include one or more processors, such as a central processing unit (CPU), and the like, to execute the recovery algorithms 152 to process the seismic sample data. The processor 141 can be implemented using any suitable architecture, such as x86, ARM, and the like.

The memory 151 includes one or more storage media that provide memory space for various storage needs. In one example, the memory 151 includes memory spaces allocated for system storage. The storage media include, but are not limited to, hard disk drive, optical disc drive, solid state drive, read-only memory (ROM), dynamic random access memory (DRAM), static random access memory (SRAM), flash memory, and the like.

In various examples, the processing system 140 uses various recovery algorithms to recover seismic data from the seismic sample data. The recovery algorithms in compressive sensing have been described in the work of Y. F. Wang, J. J. Cao, and C. C. Yang, Recovery of seismic wavefields based on compressive sensing by a l1-norm constrained trust region method and the piecewise random sub-sampling, Geophys. J. Int. (2011), and the work of J. J. Cao, Y. F. Wang, J. T. Zhao and C. C. Yang, A review on restoration of seismic wavefields based on regularization and compressive sensing, Inverse Probl. Sci. Eng. 19 (2011), 679-704. These two works are incorporated herein by reference in their entities.

Figure 3:
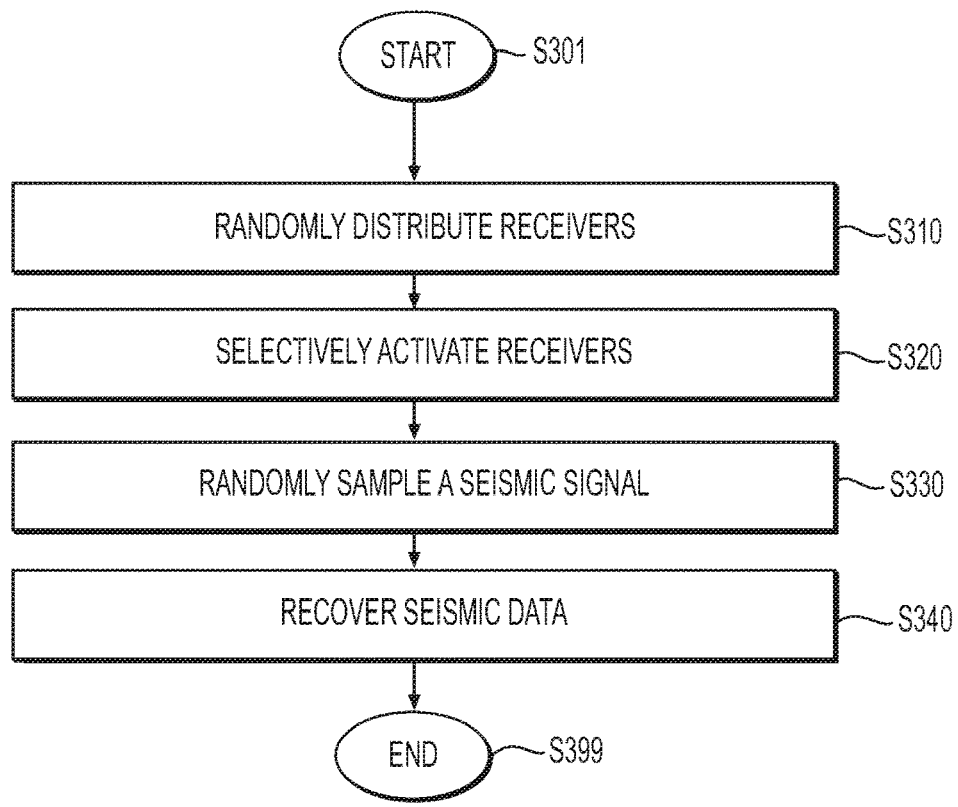
FIG. 3 shows a flow chart of a process for seismic sample data acquisition and processing according to an embodiment of the disclosure.

FIG. 3 shows a flow chart of a process 300 for seismic sample data acquisition and processing according to an embodiment of the disclosure. The process 300 starts from S301, and proceeds to S310.

At S310, receivers are randomly distributed along a receiver line of a sampling grid in a survey region. For example, at a planning stage of a seismic survey, a sensing matrix for compressive sensing is determined for each receiver line. The sensing matrices can include randomly selected rows of an identity matrix. As a result, positions of a receiver line are randomly selected to deploy a receiver, and seismic sample data can only be generated at the selected position. In this way, volumes of seismic sample data can be reduced.

At S320, receivers deployed in a sampling grid are selectively activated to generate seismic sample data. For example, in a marine survey, receivers are initially deployed at all receiver positions. Thereafter during the survey process, the deployed receivers can be selectively activated according to a sensing matrix using a data collection system 130. In this way, a seismic survey can have flexibility of dynamically selecting a portion of initially distributed receivers according to certain sensing matrices.

At S330, a seismic signal caused by a shot is randomly sampled at a receiver. For example, a receiver randomly samples a seismic signal based on sampling configuration parameters, such as operation rate and sampling probability, to generate seismic sample data. The seismic sample data can be received and stored at a data collection system, then transmitted to a processing system.

At S340, seismic data is recovered based on the seismic sample data acquired through steps S310-S330. In one example, seismic data is recovered based on seismic sample data acquired from a receiver to reconstruct a trace corresponding to the receiver. In another example, seismic data is recovered based on seismic sample data acquired from a group of receivers randomly distributed at S310 to reconstruct traces at receiver positions where no receiver has been distributed at S310. In a further example, seismic data is recovered based on seismic sample data acquired from a group of receivers activated at S320 to reconstruct traces at receiver positions where the receivers are not activated during the seismic survey. The process proceeds to S399 and terminates at S399.

It is noted that in various examples implementing the process 300, not all steps are required to be performed. For example, either or both of the steps S310 or S320, can be omitted depending sampling schemes determined for various seismic surveys.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A system for seismic sample data acquisition and processing, comprising an acquisition system configured to acquire seismic sample data using compressive sensing, the acquisition system including:
   a plurality of receivers each configured to randomly sample a seismic signal to generate seismic sample data; and
   a data collection system configured to control sampling operations of the plurality of receivers, and receive and store the generated seismic sample data, the data collection system including a receiver controller configured to:
      generate a receiver activation signal to selectively activate a portion of the plurality of receivers according to at least one sensing matrix.

2. The system of claim 1, wherein the data collection system includes:
   a data storage system configured to store the generated seismic sample data.

3. The system of claim 1, wherein each of the plurality of receivers includes:
   a sensor configured to sense a seismic wave to generate the seismic signal;
   a sampling controller configured to generate a random time-varying pulse sequence based on the sampling configuration parameters; and
   an analog to digital converter configured to sample the seismic signal based on the random time-varying pulse sequence.

4. The system of claim 3, wherein the configuration parameters include an operation rate, and a sampling probability.

5. The system of claim 4, wherein the sampling controller includes:
   a random number generator configured to generate a random number at the operation rate;
   a comparator configured to compare the random number with the sampling probability, and generate a trigger signal when the random number is smaller than the sampling probability; and
   a pulse generator configured to generate a pulse of the random time-varying pulse sequence when triggered by the trigger signal.

6. The system of claim 3, wherein the sampling controller starts a pulse generation operation after receiving the receiver activation signal.

7. The system of claim 1, wherein each of the plurality of receivers communicates with the data collection system wirelessly.

8. The system of claim 1, further comprising a processing system configured to recover seismic data from the seismic sample data, the processing system including:
- a processor configured to execute code instructions, and
- a memory configured to store recovery algorithms including code instructions which, when executed by the processor, causes the processor to recover the seismic data from the seismic sample data.

9. The system of claim 8, wherein the processing system recovers the seismic data from the seismic sample data using one of curvelet transform, radon transform, wave-atom transform, and Fourier transform.

* * * * *